April 13, 1937. P. FRANKLIN 2,076,766

LOCOMOTIVE DRIVER BRAKE

Filed Nov. 13, 1936

INVENTOR
PHILIP FRANKLIN
BY *Wm. N. Cady*
ATTORNEY

Patented Apr. 13, 1937

2,076,766

UNITED STATES PATENT OFFICE 2,076,766

LOCOMOTIVE DRIVER BRAKE

Philip Franklin, King's Cross, London, England, assignor to The Westinghouse Air Brake Company, Wilmerding, Pa., a corporation of Pennsylvania Application November 13, 1936, Serial No. 110,629
In Great Britain November 9, 1935

16 Claims. (Cl. 188—54)

This invention relates to brake rigging for railway vehicles and more particularly to that type of brake rigging in which there are two brake blocks or shoes located between two adjacent wheels on each side of the vehicle, and in which the brake blocks or shoes between two adjacent wheels are so arranged that one is movable into and out of braking engagement with one of the wheels and the other is movable into and out of braking engagement with the other of the wheels.

In some recent designs of railway vehicles, such for instance as locomotives, the adjacent wheels at each side of the vehicle are arranged so close together as to preclude the use of the usual well known arrangement of brake shoes and brake shoe controlling levers of a brake rigging of the above mentioned type.

The principal object of the invention is to provide an improved brake rigging of the above mentioned type which is so constructed and the parts thereof so arranged that it will be free of the above objection.

A further object of the invention is to provide improved brake rigging adapted to enable the use of a plurality of brake shoes on each of the wheels of a vehicle having a series of closely spaced wheels.

This object I attain by locating two brake blocks or shoes between the treads of two adjacent wheels on each side of the vehicle and spacing them apart vertically in staggered relationship with each other and arranging them preferably one above and the other below a horizontal plane extending through the axes of the wheels and providing a compact lever arrangement for actuating the brake blocks or shoes.

Figure 1:
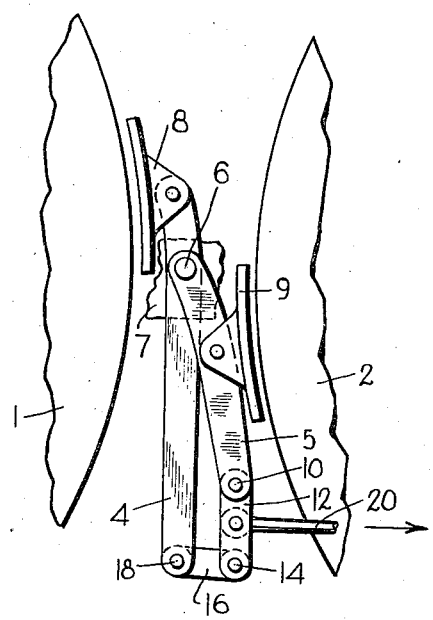
Figure 2:
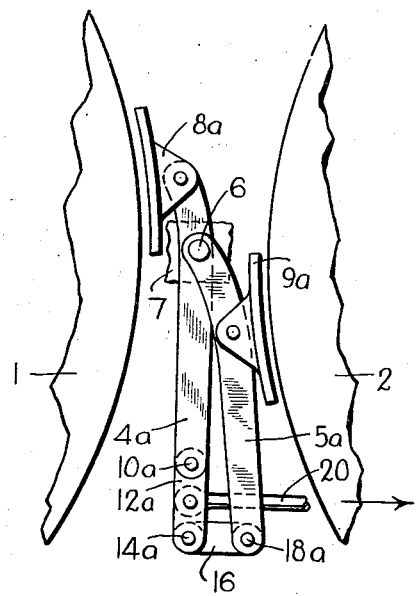

Other objects of the invention and features of novelty will be apparent from the following description taken in connection with the accompanying drawing, in which, Fig. 1 is a fragmentary view of a vehicle provided with one form of brake rigging embodying my invention, and Fig. 2 is a view similar to Fig. 1, but showing a modified form of brake rigging embodying this invention.

Referring to Fig. 1 of the drawing there is illustrated therein portions of two adjacent wheels, 1 and 2, which may be the driving wheels of a locomotive. The brake apparatus provided by this invention comprises a pair of levers 4 and 5 which are pivotally supported on a pin 6. The pin 6 is rigidly supported by a rigid part 7 of the locomotive structure, at a point intermediate the wheels 1 and 2 and substantially in the horizontal plane extending through the axes of these wheels.

The lever 4 projects above the pin 6 and has pivotally secured thereon a brake head 8 which carries a brake shoe which is adapted to engage the tread of the wheel 1 in a zone located vertically above the horizontal plane extending through the axes of the wheels 1 and 2. The lever 5 has a brake head 9 pivotally secured thereon at a point beneath the pin 6, and this brake head carries a brake shoe adapted to engage the tread of the wheel 2 in a zone located vertically beneath the horizontal plane extending through the axes of the wheels.

The lever 5 extends beneath the pin 6 a somewhat shorter distance than the lever 4, and has pivotally secured to the lower end thereof by means of a pin 10, an equalizing member 12, which has pivotally connected to the other end thereof by means of a pin 14, a link 16, which is connected to the lower end of the lever 4 by means of the pin 18.

The equalizing member 12 has pivotally secured thereto intermediate the pins 10 and 14 a brake applying member in the form of a brake pull rod 20.

The brake equipment is shown in Fig. 1 in the release position, and on an application of the brakes the brake pull rod 20 is moved to the right, as viewed in the drawing, thereby moving the equalizing member 12 and the lower ends of the levers 4 and 5 to the right.

On this movement of the levers 4 and 5 the brake heads 8 and 9 are moved closer to the tread of the wheels 1 and 2, respectively. On engagement of the shoe carried by either of the brake heads with the rim of the wheel with which it is associated further movement of the lever on which this shoe is carried is prevented, and on further movement of the brake pull rod 20 to the right the equalizing member 12 pivots about the pin by which is connected to this lever and moves the other of the levers in the direction to press the shoe carried thereby into engagement with the tread of the wheel with which it is associated. On movement of this shoe into engagement with the wheel further movement of this lever is prevented and force exerted by the pull rod 20 on the equalizing member 12 is transmitted through this member to the levers 4 and 5 to press the brake shoes carried by the brake heads 8 and 9 against the treads of the wheels 1 and 2.

The various elements of the brake equipment are arranged and proportioned so that on an application of the brakes substantially equal forces are exerted on the brake shoes to press them against the treads of the wheels.

On the release of the brakes following an application, a release spring, not shown, incorporated in the brake rigging moves the pull rod 20 to the left, as viewed in the drawing, thereby moving the lower ends of the levers 4 and 5 to the left and causing the brake heads 8 and 9 to be moved away from the rims of the wheels 1 and 2, respectively.

In Fig. 2 of the drawing there is illustrated a modified form of brake rigging embodying my invention. This brake rigging is similar to that shown in Fig. 1 of the drawing and comprises levers 4a and 5a which are pivotally mounted on a fixed pin 6, which is supported by a rigid part 7 of the locomotive structure at a point intermediate the wheels 1 and 2 and substantially in the horizontal plane extending through the axes of these wheels.

The lever 4a projects above the pin 6 and has pivotally supported thereon a brake head 8a which carries a brake shoe which is adapted to engage the rim of the wheel 1 in a zone located vertically above the horizontal plane extending through the axes of the wheels 1 and 2, while the lever 5a has pivotally mounted thereon a brake head 9a which carries a brake shoe which is adapted to engage the rim of the wheel 2 in a zone located vertically beneath the horizontal plane extending through the axes of these wheels.

In this embodiment of the invention the lever 4a extends beneath the pin 6 a somewhat shorter distance than the lever 5a and has pivotally secured to the lower end thereof by means of a pin 10a, an equalizing member 12a to which is connected by means of a pin 14a, a link 16, while the other end of this link is connected by means of a pin 18a to the lower end of the lever 5a.

A brake applying member in the form of a pull rod 20 is connected to the equalizing member 12a at a point intermediate the pins 10a and 14a.

The operation of this embodiment of the invention is substantially the same as that shown in Fig. 1 of the drawing, and on an application of the brakes the brake pull rod 20 is moved to the right, as viewed in the drawing, thereby exerting force through the equalizing member 12a to move the levers 4a and 5a to press the brake shoes carried thereby into engagement with the rims of the wheels 1 and 2 with substantially equal force.

It will be apparent that either of the above described brake arrangements may be reversed about both a horizontal and vertical line passing through the fixed axis 6 so that the ends of the hanger levers at which the braking force is applied extend upwardly instead of downwardly.

Each of the embodiments of the invention is shown in connection with two adjacent wheels, but it will be understood that if the locomotive has more than two driving wheels, similar brake rigging may be provided between each of the adjacent wheels.

While two illustrative embodiments of the improved brake rigging provided by my invention have been illustrated and described in detail, it should be understood that the invention is not limited to these details of construction and that numerous changes and modifications may be made without departing from the scope of the following claims.

Having now described my invention, what I claim as new and desire to secure by Letters Patent, is:

1. In a brake equipment for a vehicle having a plurality of wheels, a pair of members extending between adjacent wheels and pivotal about an axis intermediate said wheels, one of said members carrying a brake shoe adapted to engage one of said wheels in a zone vertically above said axis, the other of said members carrying a brake shoe adapted to engage the other of the said wheels in a zone vertically beneath said axis, an equalizing element pivotally connected to said first named member at a point thereon a given distance from said axis and pivotally connected to said second named member at a point thereon less distant from said axis and said given distance, and a brake applying member operating through said equalizing element to move said members to press the brake shoes against the wheels.

2. In a brake equipment for a vehicle having a plurality of wheels, a pair of members extending between adjacent wheels and pivotal about an axis intermediate said wheels, one of said members carrying a brake shoe adapted to engage one of said wheels in a zone located vertically above said axis, the other of said members carrying a brake shoe adapted to engage the other of said wheels in a zone located vertically beneath said axis, and common means for moving said members about said axis to press said shoes against the wheels.

3. In a brake equipment for a vehicle having a plurality of wheels, a pair of members extending between adjacent wheels and pivotal about an axis intermediate said wheels and substantially in the horizontal plane extending through the axes of the said wheels, one of said members carrying a brake shoe adapted to engage one of said wheels in a zone located vertically above said axis, the other of said members carrying a brake shoe adapted to engage the other of said wheels in a zone located vertically beneath said axis, and common means for moving said members about said axis to press said shoes against the wheels.

4. In a brake equipment for a vehicle having a plurality of wheels, a pair of members extending between adjacent wheels and pivotal about an axis intermediate said wheels, one of said members carrying a brake shoe adapted to engage one of said wheels in a zone located vertically above said axis, the other of said members carrying a brake shoe adapted to engage the other of said wheels in a zone located vertically beneath said axis, an element pivotally connected to one of said members at a point thereon a given distance from said axis, a link pivotally connected to said element and to the other of said members at a point farther removed from said axis than said first named point, and means pivotally connected to said element intermediate the points of connection of said element with said member and said link for effecting movement of said members to press the brake shoes against the wheels.

5. In a brake equipment for a vehicle having a plurality of wheels, a pair of members extending between adjacent wheels and pivotal about an axis intermediate said wheels, one of said members carrying a brake shoe adapted to engage one of said wheels in a zone located vertically above said axis, the other of said members carrying a brake shoe adapted to engage the other of said wheels in a zone located vertically beneath said axis, an equalizing element pivotally connected to said members as points spaced unequal distances from said axis, and a brake applying member pivotally connected to said equalizing element at a point intermediate the points of connection of said elements with said members.

6. In a brake equipment for a vehicle having a plurality of wheels, a pair of members extending between adjacent wheels and pivotal about an axis intermediate said wheels, one of said members carrying a brake shoe adapted to engage one of said wheels in a zone located vertically above said axis, the other of said members carrying a brake shoe adapted to engage the other of said wheels in a zone located vertically beneath said axis, an equalizing element pivotally connected to said members at points spaced unequal distances from said axis, and means acting through said equalizing element to move said members to press said shoes against the wheels.

7. In brake equipment for a vehicle having a plurality of wheels, a pair of members extending between adjacent wheels and pivotal about an axis intermediate said wheels, one of said members carrying a brake shoe adapted to engage one of said wheels in a zone located vertically above said axis, the other of said members carrying a brake shoe adapted to engage the other of said wheels in a zone located vertically beneath said axis, an equalizing element pivotally connected to one of said members at a point spaced from said axis and pivotally connected through a link to the other of said members at a point spaced from said first named point, and a brake applying member pivotally connected to said equalizing element at a point intermediate the points of connection of said equalizing element with said member.

8. In a brake rigging adapted for use on a vehicle having a series of wheels, in combination, a pair of members pivotally movable about a fixed axis located intermediate adjacent ones of said wheels, one of said members carrying a brake shoe adapted to engage one of said wheels in a zone vertically above the horizontal plane extending through the axes of said wheels, the other of said members carrying a brake shoe adapted to engage the other of the said wheels in a zone vertically beneath said plane, and means to move said members in the same direction about said axis and thereby press the brake shoes against the rails.

9. In a brake rigging adapted for use on a vehicle having a series of wheels, in combination, a hanger lever having a fixed fulcrum intermediate its ends and intermediate adjacent ones of said wheels, a brake shoe operatively by one end of said lever into and out of braking engagement with one of said wheels, a second hanger lever having a fixed fulcrum at one end, a brake shoe arranged in a different horizontal plane from that of the first mentioned brake shoe and operatively connected to the second mentioned hanger lever intermediate the ends of the lever for movement into and out of braking engagement with the other of said wheels, and an equalizing lever connected to both of said hanger levers and operable to actuate said hanger levers.

10. In a brake rigging adapted for use on a vehicle having a series of wheels, in combination, a hanger lever having a fixed fulcrum intermediate its ends and intermediate adjacent ones of said wheels, a brake shoe operative by one end of said lever into and out of braking engagement with one of said wheels, a second hanger lever having a fixed fulcrum at one end, a brake shoe arranged in a different horizontal plane from that of the first mentioned brake shoe and operatively connected to the second mentioned hanger lever intermediate the ends of the lever for movement into and out of braking engagement with the other of said wheels, and an equalizing lever connected to both of said hanger levers and operable to actuate said hanger levers, one end of said equalizing lever being directly connected to one of said hanger levers and being connected to the other of said hanger levers through a link.

11. In a brake rigging adapted for use on a vehicle having a series of wheels, in combination, a hanger lever having a fixed fulcrum intermediate its ends and intermediate adjacent ones of said wheels, a brake shoe operative by one end of said lever into and out of braking engagement with one of said wheels, a second hanger lever having a fixed fulcrum at one end, a brake shoe arranged in a different horizontal plane from that of the first mentioned brake shoe and operatively connected to the second mentioned hanger lever intermediate the ends of the lever for movement into and out of braking engagement with the other of said wheels, and an equalizing lever connected to both of said hanger levers and operable to actuate said hanger levers, said equalizing lever forming an end extension for one of said hanger levers, and a link operatively connecting the equalizing lever and the other of said hanger levers.

12. In a brake rigging adapted for use on a vehicle having a series of wheels, in combination, a hanger lever having a fixed fulcrum intermediate its ends and intermediate adjacent ones of said wheels, a brake shoe operative by one end of said lever into and out of braking engagement with one of said wheels, a second hanger lever having a fixed fulcrum at one end, a brake shoe arranged in a different horizontal plane from that of the first mentioned brake shoe and operatively connected to the second mentioned hanger lever intermediate the ends of the lever for movement into and out of braking engagement with the other of said wheels, and an equalizing lever connected to both of said hanger levers and operable to actuate said hanger levers, said equalizing lever being directly connected to the first mentioned hanger lever and being connected to the other hanger lever through a link.

13. In a brake rigging adapted for use on a vehicle having a series of wheels, in combination, a hanger lever having a fixed fulcrum intermediate its ends and intermediate adjacent ones of said wheels, a brake shoe operative by one end of said lever into and out of braking engagement with one of said wheels, a second hanger lever having a fixed fulcrum at one end, a brake shoe arranged in a different horizontal plane from that of the first mentioned brake shoe and operatively connecter to the second mentioned hanger lever intermediate the ends of the lever for movement into and out of braking engagement with the other of said wheels, and an equalizing lever connected to both of said hanger levers and operable to actuate said hanger levers, said equalizing lever being directly connected to the second mentioned hanger lever and being connected to the other hanger lever through a link.

14. In a brake rigging adapted for use on a vehicle having a series of wheels, in combination, a fixed fulcrum member disposed intermediate adjacent ones of said wheels, a vertically disposed hanger lever pivotally mounted intermediate its ends on said member, a second vertically disposed hanger lever pivotally mounted at one end on said member, a brake shoe located between said wheels and above said fulcrum member operative by the first mentioned hanger lever into braking engagement with one of said wheels, a brake shoe located between said wheels and below said fulcrum member operative by the second mentioned hanger lever into braking engagement with the other of said wheels, and means common to both hanger levers for actuating said levers.

15. In a brake rigging adapted for use on a vehicle having a series of wheels, in combination, a fixed fulcrum member disposed intermediate adjacent ones of said wheels, a vertically disposed hanger lever pivotally mounted intermediate its ends on said member, a second vertically disposed hanger lever pivotally mounted at one end on said member, a brake shoe located between said wheels and above said fulcrum member operative by the first mentioned hanger lever into braking engagement with one of said wheels, a brake shoe located between said wheels and below said fulcrum member operative by the second mentioned hanger lever into braking engagement with the other of said wheels, and means located below the lowest of said brake shoes for actuating said hanger levers.

16. In a brake rigging adapted for use on a vehicle having a series of wheels, in combination, a fixed fulcrum member disposed intermediate adjacent ones of said wheels, a vertically disposed hanger lever pivotally mounted intermediate its ends on said member a second vertically disposed hanger lever pivotally mounted at one end on said member, a brake shoe located between said wheels and above said fulcrum member operative by the first mentioned hanger lever into braking engagement with one of said wheels, a brake shoe located between said wheels and below said fulcrum member operative by the second mentioned hanger lever into braking engagement with the other of said wheels, a substantially vertically disposed lever directly connected to the lower end of one of said hanger levers and forming an end extension therefor, a link operatively connecting the equalizing lever and the lower end of the other hanger lever, and means for actuating said equalizing lever and thereby said hanger lever and associated brake shoes.

PHILIP FRANKLIN.

CERTIFICATE OF CORRECTION.

Patent No. 2,076,766. April 13, 1937.

PHILIP FRANKLIN.

It is hereby certified that error appears in the printed specification of the above numbered patent requiring correction as follows: Page 3, first column, line 59, claim 9, for the word "operatively" read operative; and second column, line 65, claim 13, for "connecter" read connected; and that the said Letters Patent should be read with these corrections therein that the same may conform to the record of the case in the Patent Office.

Signed and sealed this 25th day of May, A. D. 1937.

(Seal)

Henry Van Arsdale
Acting Commissioner of Patents.